United States Patent [19]

Hudgins et al.

[11] Patent Number: 4,889,639
[45] Date of Patent: Dec. 26, 1989

[54] MICROWAVE EMULSION TREATER WITH CONTROLLED FEED WATER CONTENT

[75] Inventors: Roger L. Hudgins; Steven E. Hawkins, both of Ponca City, Okla.

[73] Assignee: Conoco Inc., Ponca City, Okla.

[21] Appl. No.: 208,937

[22] Filed: Jun. 16, 1988

[51] Int. Cl.⁴ .............................................. B01D 17/12
[52] U.S. Cl. .................................. 210/739; 210/748; 210/105; 210/194
[58] Field of Search ............... 210/739, 708, 748, 105, 210/243, 175, 194, 103, 177; 208/DIG. 1

[56] References Cited

U.S. PATENT DOCUMENTS

| | | | |
|---|---|---|---|
| 2,288,333 | 6/1942 | Vinson | 210/177 |
| 3,520,415 | 7/1970 | Cymbalisty | 210/177 |
| 4,013,558 | 3/1977 | Rosenberg | 210/243 |
| 4,581,134 | 4/1986 | Richter et al. | 210/105 |
| 4,726,896 | 2/1988 | Grove et al. | 210/96.1 |

FOREIGN PATENT DOCUMENTS

| | | | |
|---|---|---|---|
| 0095503 | 6/1983 | Japan | 210/748 |
| 0095519 | 6/1983 | Japan | 210/748 |

Primary Examiner—W. Gary Jones
Assistant Examiner—Coreen Y. Lee

[57] ABSTRACT

A microwave-based emulsion treating method and system comprising a microwave energy source, a microwave applicator for treating an emulsion, a separator vessel for receiving and separating microwave-treated emulsion, an oil-water analyzer for determining water content of the emulsion feed, and water supply means including control means responsive to the analyzer for adding a controlled amount of water to the emulsion feed going to the applicator. The added water may be recirculated from the separator.

5 Claims, 1 Drawing Sheet

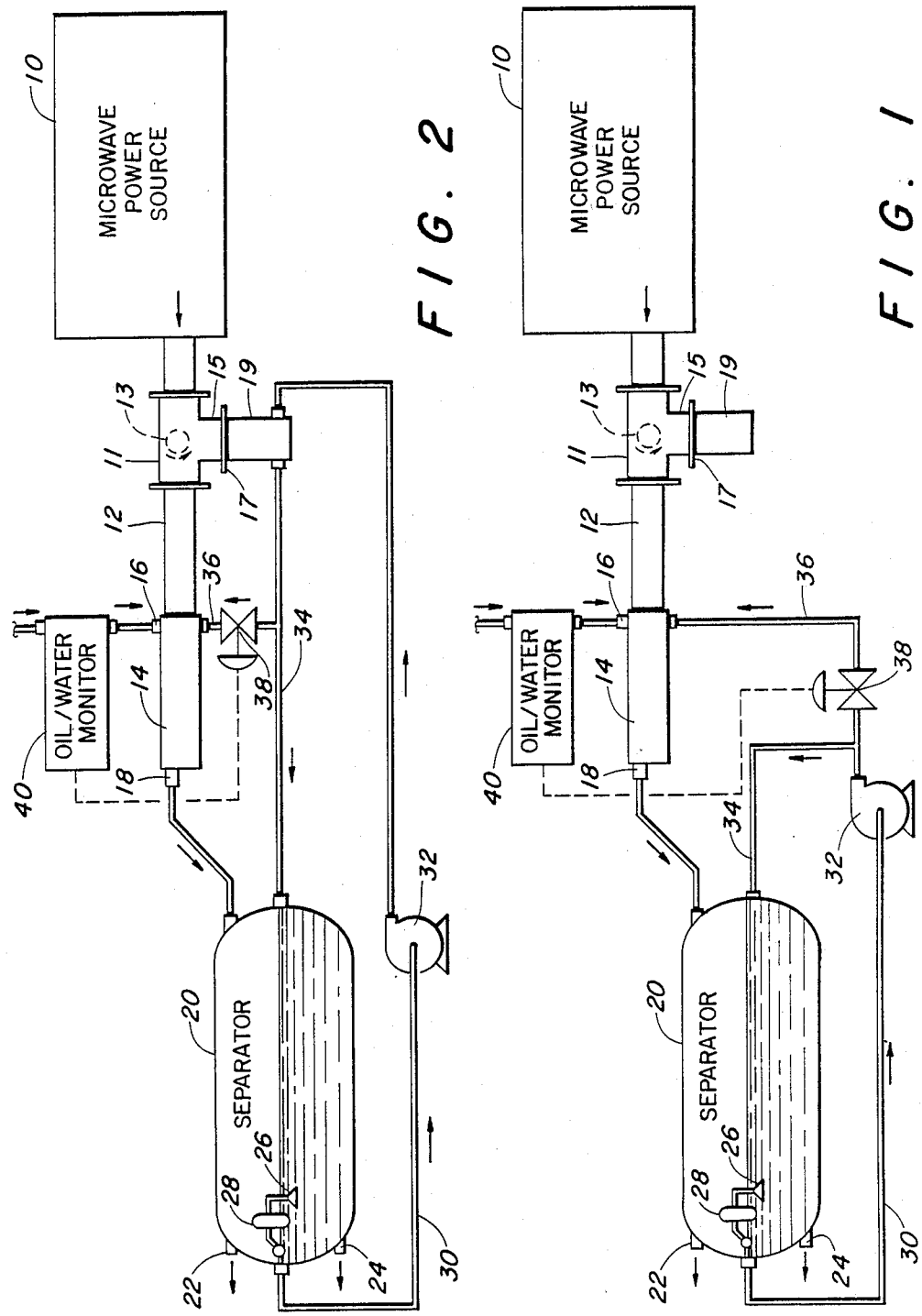

MICROWAVE EMULSION TREATER WITH CONTROLLED FEED WATER CONTENT

BACKGROUND OF THE INVENTION

1. Field of the Invention

The present invention relates to a method and apparatus for enhancing the separation of oil and water dispersions and emulsions. More particularly, the present invention is concerned with enhancing separation of oil and water emulsions and dispersions by treating the same with microwave radiation, and may be used in conjunction with more conventional separating devices.

In the petroleum industry, most of the crude oil produced is co-mingled with water and gas. It is therefore necessary to provide a means of sufficiently and economically separating the oil, gas and water for separate discharge. Usually the separated water is returned to a subterranean formation containing oil and the separated oil is conducted to a pipeline for ultimate transportation to a refinery. Normally, the separated gas is vented if in small quantities or if in commercial quantities collected for distribution and sale.

Primary production of oil from subterranean oil-bearing reservoirs is normally obtained by exploiting the natural drive energy of the reservoir in the form of water drive, gas cap drive, solution gas drive, and combinations thereof. Oil remaining in the reservoir after primary energy sources have been depleted can be partially recovered by secondary recovery methods. One of the most common secondary recovery methods is waterflooding. Using this method, flooding water is injected into the reservoir through one or more injection wells traversing the oil-bearing reservoir. The water displaces the oil in the reservoir and moves it through the reservoir toward one or more production wells from which oil is produced.

With the rising value of petroleum products, it becomes increasingly important that separator equipment utilized by the petroleum industry extract the maximum possible recovered petroleum products from oil and water emulsions and dispersions. To this end, separator systems vessels have been developed over the years. Initially, the separators were merely open vessels providing a quiet zone with the intention that the water settle out and be withdrawn from the bottom of the vessel and that the petroleum float on the water and be withdrawn from the top of the vessel. While this system is satisfactory to a degree, it nevertheless results in some oil remaining in the form of an emulsion or dispersion with the withdrawn water, and in like manner in water being entrapped with the oil withdrawn from the top of the vessel. Further, such gravitational settling procedures are slow and require vessels of such volume that to allow separation by gravitation alone becomes exceedingly expensive, and the slow separation rate results in general overall inefficiency.

2. The Prior Art

Representative but non-exhaustive examples of various types of apparatus previously used in the art are gun barrel treaters, heater treaters, and the like. An apparatus specifically designed for use in separating oil and water can be found in, for example, U.S. Pat. No. 4,257,895. The use of ultrasonics is known for breaking oil-water emulsions as described in U.S. Pat. Nos. 2,257,997; 3,200,567; and 3,594,314. Other references disclose the application of microwave energy in the recovery of oil from oil wells and oil o shale, including U.S. Pat. Nos. 3,104,711, 3,133,592; 3,170,519 and 4,180,718. Microwave energy has also been used in settling of solids and sewage and sewage sludge, such as described in U.S. Pat. No. 3,523,076.

More recently, a method for enhancing the separation of oil and water from an emulsion or dispersion was described in U.S. Pat. No. 4,582,629. The method described in that patent has been effective up to a point, but has been limited in application because of certain energy inefficiencies. The present invention provides a system for improving the efficiency of microwave-based oil-water separators.

In copending application Ser. No. 173,798 filed Mar. 28, 1988 by Roger Hudgins and Nicholas Wolf now patented U.S. Pat. No. 4,810,375, an improved microwave-based emulsion treater having an oily water circulation means for recycling oily water as a water load is described. In one aspect, the present invention is an improvement over the system described therein.

It is accordingly an object of this invention to provide a microwave-based oil-water separation system having a higher efficiency than previously available systems.

DESCRIPTION OF THE DRAWINGS

FIG. 1 is an elevational view of an embodiment of the invention where a side stream of circulating oily water is added to emulsion feed to the system.

FIG. 2 is an elevational view of a microwave-based oil-water separator system in accordance with an embodiment of the invention where oily water is circulated through the water load.

DESCRIPTION OF THE PREFERRED EMBODIMENT

The most preferred embodiments of the invention are illustrated in FIGS. 1 and 2 which depict use of recirculating oily water from a separator tank, and the following descriptions are in the context of using this recirculating oily water. However, in its broadest aspect the invention could be carried out using water from a separate source.

Referring to FIG. 1, a microwave power source 10 is provided with a circulator 11 and a wave guide 12 extending to an applicator 14. Applicator 14 is provided with inlet 16 and outlet 18 for passage of an oil-water emulsion or dispersion. Outlet 18 extends to an oil-water separator tank 20 where the microwave treated stream separates into an upper oil phase and a lower oily water phase. Outlets 22 and 24 are provided from the upper and lower portions, respectively, of separator 20 for recovery of the separated phases. Circulator 11 provides a path between microwave source 10 and wave guide 12, or it can be considered part of the wave guide. Magnets 13 are provided in circulator 11 in a known manner to deflect reflected energy down through conduit 15 and through diaphragm 17 into a water load chamber 19 on circulator 11 to prevent reflected energy from returning to and damaging the microwave energy source.

Inside separator 20 an intake means 26 is attached to and carried by a float device 28 adapted to float at the interface between the liquid phases in the separator. Intake means 26 is disposed to rest near but below the interface between the liquid phases, such that the predominantly water phase (oily water) can be withdrawn therethrough to recycle line 30.

A pump 32 is provided in recycle line 30 for pumping oily water from line 30 to return line 34 back to separator 20.

By properly positioning intake means 26, or by use of a level control (not shown), the recirculated fluid will always be predominantly water. It is preferred to arrange the float 28 and intake 26 such that intake 26 remains just below the interface of the separated phases in the separator. This can be accomplished by using flexible tubing or a suitable pivoting connection as will be apparent.

A line 36 extends from return line 34 to applicator 14. A control valve 38 on line 36 is responsive to a signal from oil-water monitor or analyzer 40 which measures the water content in the emulsion feed to applicator 14.

The heating efficiency of the system is dependent on the water content of the feed to applicator 14. The efficiency for a given system and set of operating conditions depends on several variables, such as power level, feed composition and system design, but for any given system and set of operating conditions the efficiency is a function of water content in the material passing through the applicator. For example, for a laboratory system treating a prepared emulsion of bland oil and water, the temperature rise at a given power level and time period varies from about 6° C. at 5 weight % water up to a maximum of about 60° C. at 20 weight % water and then back to about 30° C. at 50 weight % water. The optimum water cut for a given system can be determined experimentally, but would generally be in the range of 20 weight % water.

The system of this invention is useful whenever the water cut in the feed to the applicator is less than the optimum for the system.

The oil-water monitor or analyzer can be any of several commercially available units, as can the control valve which is responsive to a signal from the analyzer. The control valve is illustrated as being located in line 36, but it will be appreciated that a proportioning control valve on the outlet line from pump 32 could be used to direct from zero to all of the pump outlet to line 36, depending on the signal from analyzer 40. It will also be apparent that return line 34 could be dispensed with, with the pump output still being controlled by control valve 38, or the pump itself could be controlled by a signal from the analyzer.

The system shown in FIG. 2 differs from that of FIG. 1 in that the recirculating oily water stream is utilized as the water load in water load chamber 19 before being returned to the separator. The use of this stream as a water load is described in the aforementioned Application Ser. No. 173,798. Otherwise, the operation of the system shown in FIG. 2 is similar to that of the FIG. 1 system, except that a steady flow of oily water from pump 32 is desirable to provide an effective water load for circulator 11.

In the broadest aspect of the process of the invention, an emulsion feed stream is analyzed to obtain an output signal indicative of the water content of the stream, and when the amount of water in the emulsion is less than the amount needed for efficient utilization of microwave energy in heating the emulsion, an amount of water is added to the feed prior to application of microwave energy, the amount of added water being controlled in response to the output signal, and microwave energy is then applied to the combined emulsion and added water.

The process of treating an oil-water emulsion in accordance with the most preferred embodiments of the invention involves the steps of feeding an oil-water emulsion to a microwave applicator where it is subjected to energy from a microwave power source and then passed to a separator. The water content of the feed to the applicator is continuously monitored. An oily water recirculation means including a flow control means responsive to the amount of water in the feed stream is utilized to direct an amount of oily water to the applicator to increase the water cut in the applicator at times when the water cut of the feed stream is less than the optimum amount.

Any level of control can readily be applied to the system to control throughput, amount of energy applied, interface level, etc., to obtain a desired separation.

We claim:

1. In a microwave-based oil-water emulsion treating system comprising a microwave power source, a microwave applicator having inlet and outlet means for a feed stream of material to be treated with microwave energy, a separator for receiving treated material from said applicator, said separator including separate outlet means for removal of an oil phase and an oily water phase separated therein, the improvement comprising:
    (a) analyzer means for determining the water content of the feed stream to said applicator;
    (b) water supply means for supplying additional water to said applicator; and
    (c) control means on said water supply means for controlling the amount of additional water supplied to said applicator, said control means being responsive to a signal from said analyzer indicative of the amount of water in said feed stream to said applicator.

2. In a microwave-based oil-water emulsion treating system comprising a microwave power source, a microwave applicator having inlet and outlet means for a feed stream of material to be treated with microwave energy, a separator for receiving treated material from said applicator, said separator including separate outlet means for removal of an oil phase and an oily water phase separated therein, the improvement comprising:
    (a) oily water circulation means for withdrawing oily water from said separator and returning said oily water back to said separator;
    (b) analyzer means for determining the water content of the feed stream to said applicator;
    (c) a flowline extending from said oily water circulation means to said applicator; and
    (d) control means on said flowline for controlling the amount of oily water flowing from said oily water circulation means to said applicator, said control means being responsive to a signal from said analyzer indicative of the amount of water in said feed stream to said applicator.

3. In a microwave-based oil-water emulsion treating system comprising a microwave power source, a microwave applicator having inlet and outlet means for a feed stream of material to be treated with microwave energy, a separator for receiving treated material from said applicator, said separator including separate outlet means for removal of an oil phase and an oily water phase separated therein, circulator means between said microwave power source and said applicator for deflecting reflected microwave energy away from said power source, a water load chamber for absorbing said deflected energy, and oily water circulation means for circulating an oily water stream from said separator through said water load chamber and back to said separator, the improvement comprising:
 (a) analyzer means for determining the water content of the feed stream to said applicator;
 (b) a flowline connected to said oily water circulation means and extending to said applicator; and
 (c) control means on said flowline for controlling the amount of oily water flowing from said oily water circulation means to said applicator, said control means being responsive to a signal from said analyzer indicative of the amount of water in said feed stream to said applicator.

4. In a process for separating an oil-water emulsion or dispersion by application of microwave energy thereto, the improvement comprising:
 (a) analyzing said emulsion or dispersion to obtain an output signal indicative of the water content thereof;
 (b) determining the amount of water in said emulsion or dispersion to maintain a desired level for efficient separation, and adding an additional amount of water to said emulsion or dispersion, the amount of water added being controlled by said output signal; and
 (c) applying microwave energy to said combined emulsion or dispersion and added water.

5. The process of claim 4, wherein the added water is water that has been previously separated from said emulsion or dispersion.

* * * * *